US005891290A

United States Patent [19]

Deurer et al.

[11] Patent Number: 5,891,290

[45] Date of Patent: Apr. 6, 1999

[54] METHOD FOR THE TRANSFER OF SECTIONS THAT ARE SELF-ADHESIVE ON ONE SIDE FROM A MOVING FIRST WEB ONTO A MOVING SECOND WEB

[75] Inventors: Lothar Deurer, Koblenz; Ludwig Grader, Andernach; Thomas Hille; Peter Steinborn, both of Neuweid, all of Germany

[73] Assignee: LTS Lohmann Therapie-Systeme GmbH, Neuwied, Germany

[21] Appl. No.: 704,497

[22] PCT Filed: Feb. 24, 1995

[86] PCT No.: PCT/EP95/00671

§ 371 Date: Nov. 15, 1996

§ 102(e) Date: Nov. 15, 1996

[87] PCT Pub. No.: WO95/23687

PCT Pub. Date: Sep. 8, 1995

[30] Foreign Application Priority Data

Mar. 3, 1994 [DE] Germany .......................... 44 06 976.6

[51] Int. Cl.$^{6}$ ............................ B32B 31/00; B31D 1/02; B65C 9/00

[52] U.S. Cl. ........................... 156/249; 156/248; 156/265

[58] Field of Search .................................... 156/249, 540, 156/541, 542, 552, DIG. 19, DIG. 28, DIG. 33, 265, 248

[56] References Cited

U.S. PATENT DOCUMENTS

| | | | |
|---|---|---|---|
| 3,574,026 | 4/1971 | Kucheck . | |
| 4,059,203 | 11/1977 | Wright | 156/542 X |
| 4,303,461 | 12/1981 | Le Mers | 156/541 X |
| 4,369,085 | 1/1983 | Hermann | 156/541 X |
| 4,479,842 | 10/1984 | Fujita | 156/541 X |

FOREIGN PATENT DOCUMENTS

| | | |
|---|---|---|
| 3 104 035 | 10/1984 | Germany . |
| 3 832 239 | 3/1990 | Germany . |
| 4 232 279 | 10/1993 | Germany . |
| 2 208 505 | 4/1989 | United Kingdom . |

*Primary Examiner*—Curtis Mayes

*Attorney, Agent, or Firm*—Wenderoth, Lind & Ponack, L.L.P.

[57] ABSTRACT

A device for the transfer of sections (10) that are self-adhesive on one side from a moving first web (20) onto a moving second web (21), portions (11) to be discarded remaining undetached on the first web (20), comprising a dispenser edge (1) that is associated to and extends across the direction of the first web (20) and around which the web (20) is led with reversal of its direction to release the sections (10) is characterized by the fact that the dispenser edge (1) has a shape in the region of portions (11) that are not to be detached which is different from that in the region of portions (10) that are to be released.

10 Claims, 3 Drawing Sheets

FIG. 4
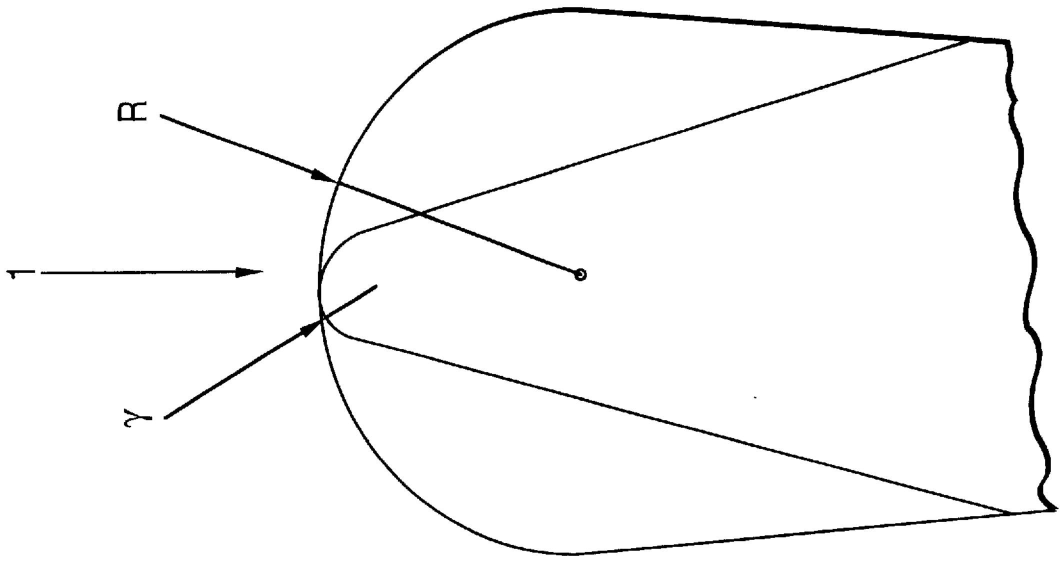
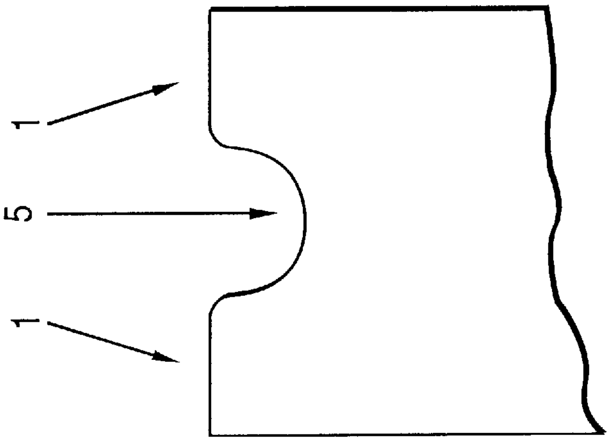
FIG. 3

METHOD FOR THE TRANSFER OF SECTIONS THAT ARE SELF-ADHESIVE ON ONE SIDE FROM A MOVING FIRST WEB ONTO A MOVING SECOND WEB

BACKGROUND OF THE INVENTION

The present invention relates to a device for the transfer of sections that are self-adhesive on one side from a moving first web onto a moving second web, portions to be discarded remaining attached on the first web, comprising a dispenser edge that is associated to and extends across the direction of the first web and around which the web is led with reversal of its direction when the sections are released.

To allow detachment of individual, one-side self-adherent sections from a first web and their transfer onto a second web, a web-shaped material must first be obtained and are available according to the present state of the art. To this end, cuts must be made such that the unnecessary self-adhesive material forms a coherent lattice which is peeled off immediately after the sections have been punched out. The desired scrapless sections may then easily be released by means of a conventional dispensing edge.

DESCRIPTION OF RELATED ART

The large amount of self-adhesive refuse resulting in this process is disadvantageous. If the waste consists of very expensive and highly pollutive material, this disadvantage is particularly serious. DE 42 32 279 describes a process wherein self-adhesive sections are punched, detached, and transferred to produce transdermal therapeutic systems. The advantage of the known method is that there is no self-adhesive waste; however, it is limited to rectangular or square sections.

DE 38 32 239 describes a process and a device for the partial distribution of individual components of a web. The partial distribution is achieved by free punching; the waste must form a coherent lattice to peel it off and wind it up. However, this process is not suitable for self-adhesive sections. GB 22 08 505 describes a specially shaped dispenser edge. To increase the rigidity of the sections to be released, it has a wave-like form. However, partial detachment is not achieved by means of this design. DE 31 04 035 describes a dispensing edge in the form of a roll having a central interruption. Said break serves as a rest for the axle and does not influence the dispensing function of the dispenser edge.

BRIEF DESCRIPTION OF THE INVENTION

It is the object of the present invention to advance and improve a device for the transfer of sections that are self-adhesive on one side from a moving first web onto a moving second web, comprising a dispenser edge that is associated to and extends across the direction of the first web and around which the web is guided with reversal of its direction when the sections are released, in such a manner that portions adhere to the first web attached; preferably, marginal portions remain on the web without having to form a coherent lattice. The dispenser edge has a leading edge which is perpendicular to the direction of travel of the first web.

According to the present invention this object is achieved in a device which is capable of transferring self-adhesives from one moving web to another moving web, by the fact that the design of the dispenser edge differs in the region of the portions which are not to be detached from that in the region of the sections which are to be detached.

According to a preferred embodiment, some regions of the dispenser edge are interrupted by at least one recess. The mechanism of this embodiment is based on the fact that the elastic supporting film is less deflected in those regions of the dispenser edge where it is interrupted, for example, by a recess; for this reason the portions which are punched free in this area or areas are not detached and remain adhering to the moving first web as single or coherent waste.

According to one embodiment the dispenser edge is interrupted by two lateral recesses which preferably are symmetrical to the central axis of the dispenser edge. This embodiment is particularly suitable if there are marginal portions, which is the case when corners of sections that are to be released are rounded or beveled. However, according to another embodiment, the dispenser edge may also be interrupted by a central recess. Such a measure may be suitable, for example, if sections on an elastic supporting film are to be released in pairs by means of a free-punched central strip, then said central strip, which forms the waste, adheres to the first web after release of the sections.

In case of the above-mentioned embodiments, the present invention always provides that the dispenser edge exhibits the recesses in those regions of the first web where portions are to remain attached.

According to another embodiment of the device, some regions of the dispenser edge have different radii of curvature, the radius of curvature in those regions of the first web where portions remain attached being substantially larger than that in the other web regions.

Additionally, the present invention provides a use of the device for the transfer of one-side self-adhesive portions from a moving first web to a moving second web for sections in the form of rectangles or squares having cut-off, rounded, or beveled corners, the portions left between the corners remaining attached on the first web.

Moreover, the present invention provides a use of the device for sections contacting one another on the moving first web.

Finally, the present invention provides a use of the device for active substance-containing sections.

Using a dispenser edge having one of the aforementioned design features, self-adhesive rectangles or squares with rounded or beveled corners, for example, may be released from a moving web. There is no need for dividers to be left between said squares or rectangles, i.e., they may contact one another. After removal of said sections, the remaining material adheres as scrap to the edge region of the web. Most advantageously, this process avoids larger amounts of waste which would result in the case of separating. Thus, costs are saved if expensive active substances and auxiliary agents are used; this does not only apply to the active substances and auxiliary agents but also to their very expensive disposal. The process may advantageously be used for the manufacture of transdermal therapeutic systems. In this case, rectangular or square forms having round corners are favorable, because they are advantageous for the adhesion to human skin.

The advantages which can generally be achieved by the present invention are that self-adhesive sections may be released from a moving web, and that portions which are not required remain on the web. This allows the production of sections slightly deviating from the form of a rectangle or square, for example, having rounded or beveled corners, with a minimum of waste. The device according to the present invention is particularly advantageous for series production of transdermal therapeutic systems.

BRIEF DESCRIPTION OF THE DRAWINGS

In the following, the present invention will be illustrated with reference to exemplary embodiments, the figures showing further advantageous features of the present invention:

FIG. 3: shows a top view of the dispenser edge having a central recess;

FIG. 4: shows an enlarged side view of a dispenser edge with differing radii;

DETAILED DESCRIPTION OF THE INVENTION

Figure 1:
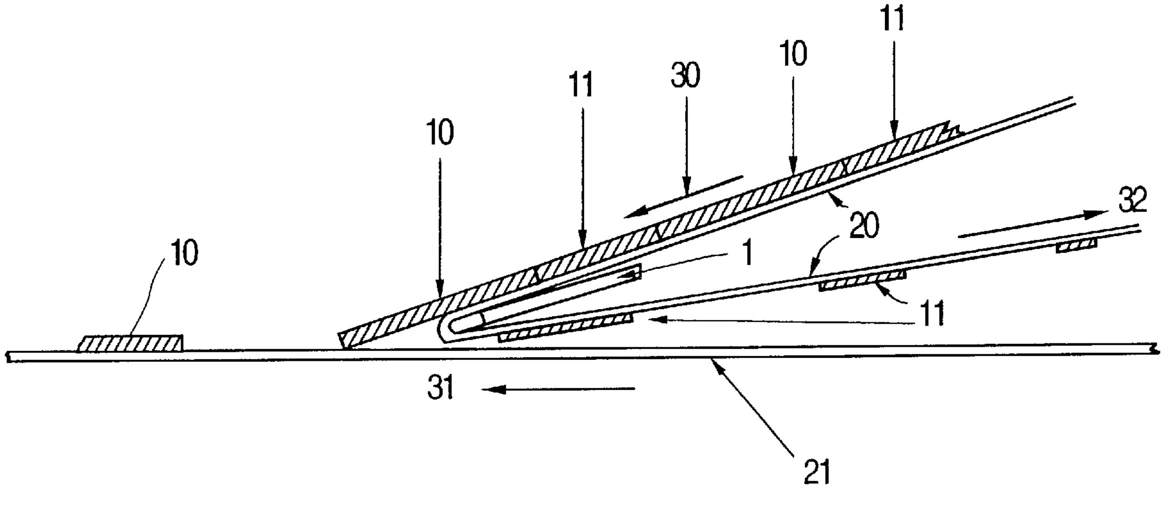
FIG. 1: shows a side view of the device.

FIG. 1 shows the device during the transfer of one-side self-adhesive sections 10 from the moving first web 20 onto a second moving web 21. Sections 10 and, between them, portions 11 which are to be discarded - separated from one another by cross cuts - are schematically arranged on the first web 20 incoming from the direction of arrow 30. When the first web is guided around the dispenser edge 1, the self-adhesive sections 10 are released owing to their self-rigidity and placed on the second web 21.

In this connection, they may be pressed by means of a pressure roller (not shown) and, with their self-adhesive layer reliably adhering, be applied on the web 21 moving in the direction of arrow 31. In an embodiment of the dispenser edge 1 according to the present invention, the portions 11 are not released, they remain as waste material - as is schematically shown - on the first web 20 which is drawn in the direction of arrow 32.

Figure 2:
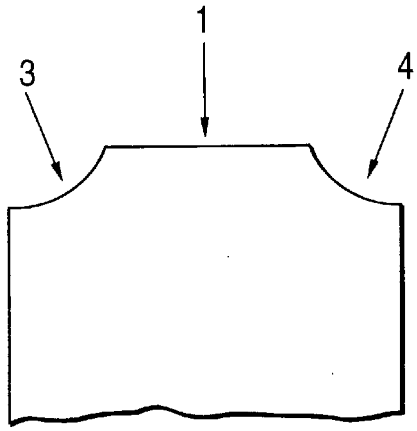
FIG. 2: shows a dispenser edge having two lateral recesses arranged symmetrical to the central axis.

FIG. 2 shows an embodiment of the dispenser edge 1 having two lateral recesses 3 and 4 arranged symmetrically to the axis.

FIG. 3 shows a top view of the dispenser edge 1 interrupted by a central recess 5.

FIG. 4 shows a side view in about tenfold enlargement of an embodiment of the dispensing edge 1 having differing radii; i.e., it has a relatively small radius (r), for example, in a central hatched portion and a relatively larger radius (R) in a lateral portion. When the supporting film 20 is deflected sections 10 are released only in the region of the small radius (r), whereas in the region of the large radius (R) portions to be rejected remain on the supporting film 20.

Figure 5:
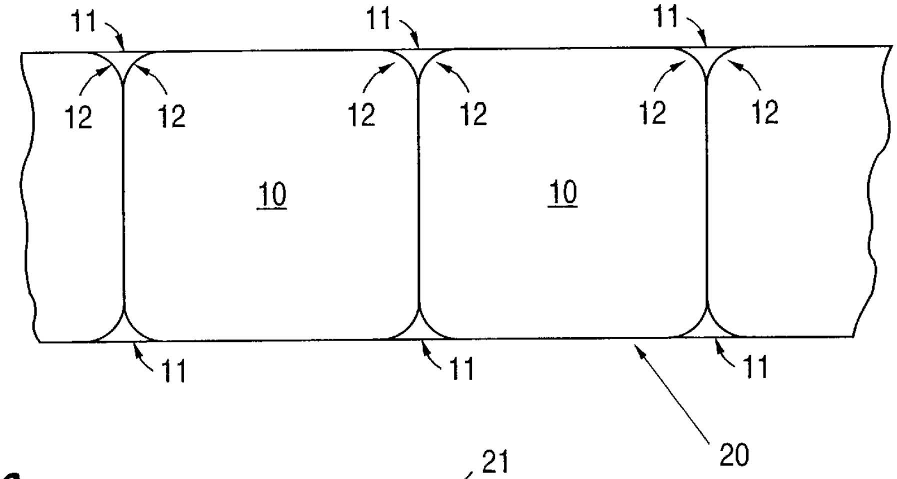
FIG. 5: shows a top view of a first web with sections thereon.

FIG. 5 shows the first web 20 with sections 10 arranged thereon, between them portions 11 which are to be rejected are present, they result from rounding the corners 12.

Figure 6:
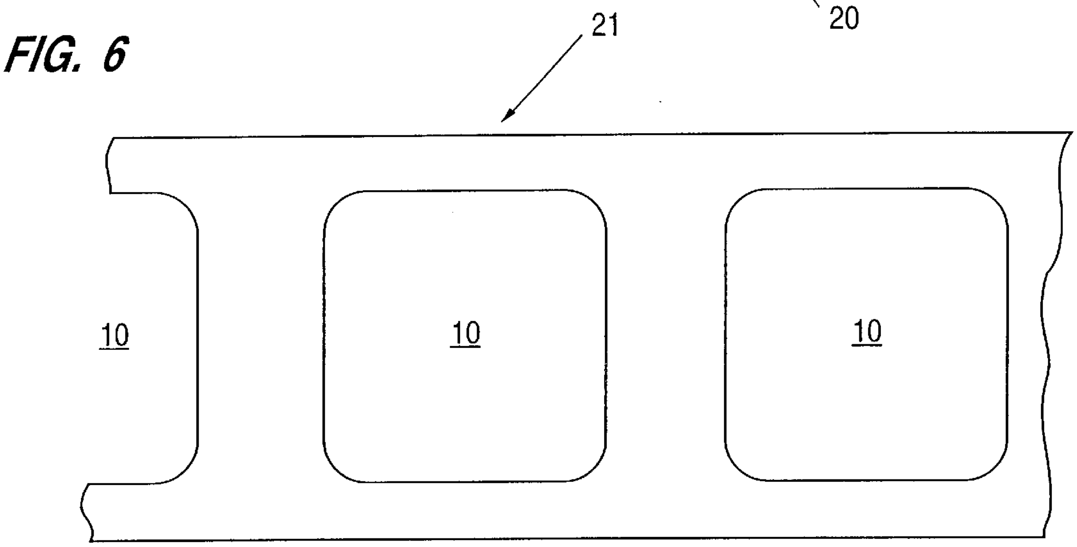
FIG. 6: shows a top view of a second web with scrapless sections transferred thereon.

FIG. 6 shows a top view of sections 10 which have been released from web 20 and transferred onto web 21.

Figure 7:
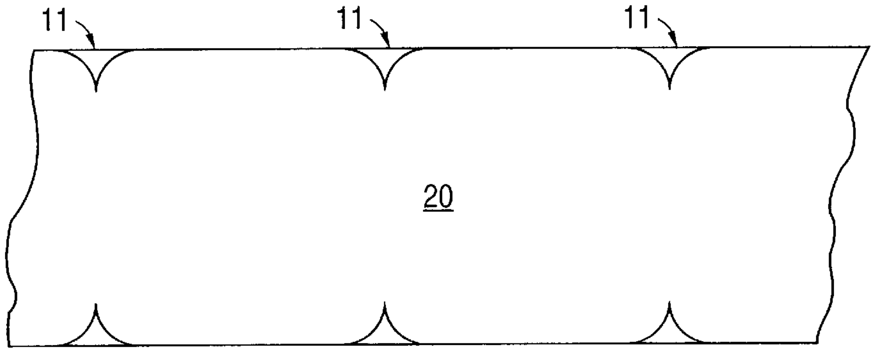
FIG. 7: shows a top view of the first web after removal of the sections with scrap portions remaining on its edges.

FIG. 7 shows the first web 20 after removal of sections 10, with undetached portions 11 to be discarded remaining thereon.

The present invention makes it possible to release self-adhesive sections from a moving web, with portions 11 which are to be discarded remaining on the web and the released portions being transferred on a second moving web. This device is advantageously suitable for the production of transdermal therapeutic systems and other active substance-containing substrates.

We claim:

1. A method of transferring a self-adhesive material from a moving first web to a moving second web without transferring cut-out or pre-punched margin portions of the self-adhesive material to the second web and wherein said cut-out or pre-punched portions remain attached to the first web comprising leading the first web over a dispenser edge having a leading edge so that the direction of the first web is substantially reversed, wherein said leading edge is perpendicular to the direction of movement of the first web, the dispenser edge is at an acute angle to the second moving web and the dispenser edge is formed such that the region of the first web, which contains the cut-out or pre-punched margin portions of the self-adhesive material, is less deflected than the region of the first web which contains the transferring self-adhesive.

2. The method according to claim 1, wherein the dispenser edge has regions which have a different radii of curvature, wherein the first web is passed over the dispenser edge such that the region of the first web having the portion of the self-adhesive which is to remain attached to the first web is passed over a region of the dispenser edge with the larger radius, and the region of the first web having portions to be transferred is passed over the region of the dispenser edge with the smaller radius.

3. The method according to claim 1, wherein the dispenser edge has at least one recess.

4. The method according to claim 3, wherein the dispenser edge has two lateral recesses.

5. The method according to claim 4, wherein the two lateral recesses are arranged symmetrically to the central axis of the dispenser edge.

6. The method according to claim 5, wherein the cut-out or pre-punched margin portions are passed over said recesses.

7. The method according to claim 4, wherein the cut-out or pre-punched margin portions are passed over said recesses.

8. The method according to claim 3, wherein the dispenser edge has one central recess.

9. The method according to claim 8, wherein the cut-out or pre-punched margin portions are passed over said recess.

10. The method according to claim 3, wherein the cut-out or pre-punched margin portions are passed over said recess.

* * * * *